United States Patent [19]
Yanagisawa

[11] Patent Number: 5,351,626
[45] Date of Patent: Oct. 4, 1994

[54] WALKING ROBOT

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 974,169

[22] Filed: Nov. 10, 1992

[30] Foreign Application Priority Data

Nov. 11, 1991 [JP] Japan ................... 3-322475

[51] Int. Cl.⁵ .............................. B62D 57/02
[52] U.S. Cl. ...................... 180/8.6; 180/164; 180/901; 901/1
[58] Field of Search ............. 180/8.5, 8.6, 8.1, 8.2, 180/901, 164; 280/5.2, 5.3, 28.5, 43.24; 901/1

[56] References Cited

U.S. PATENT DOCUMENTS

| | | | |
|---|---|---|---|
| 4,333,259 | 6/1982 | Pin-Huang | 180/8.6 |
| 4,674,949 | 6/1987 | Kroczynski | 180/8.6 |
| 4,790,400 | 12/1988 | Sheeter | 180/8.6 |

FOREIGN PATENT DOCUMENTS 0226376 11/1985 Japan ...................... 180/8.6
0036587 2/1989 Japan ...................... 180/901
3294189 12/1991 Japan .

*Primary Examiner*—Brian L. Johnson
*Assistant Examiner*—Anne Marie Boehler
*Attorney, Agent, or Firm*—Birch, Stewart, Kolasch & Birch

[57] ABSTRACT

The present invention relates to a walking robot. The robot includes: an X-elongated member; a Y-elongated member; a moving body moving on the X- and Y-elongated members; an X-leg section provided to the X-elongated member, the X-leg section being capable of extending and shortening in the Z-direction; a Y-leg section being provided to the Y-elongated member, the Y-leg section being capable of extending and shortening in the Z-direction; an X-driving mechanism for moving the moving body in the X-direction; a Y-driving mechanism for moving the moving body in the Y-direction; a first Z-driving mechanism for extending and shortening the X-leg section; and a second Z-driving mechanism for extending and shortening the Y-leg section. With this structure, the robot is able to stride over obstructions by extending the X- and the Y-leg sections so as to avoid interference without changing course.

22 Claims, 12 Drawing Sheets

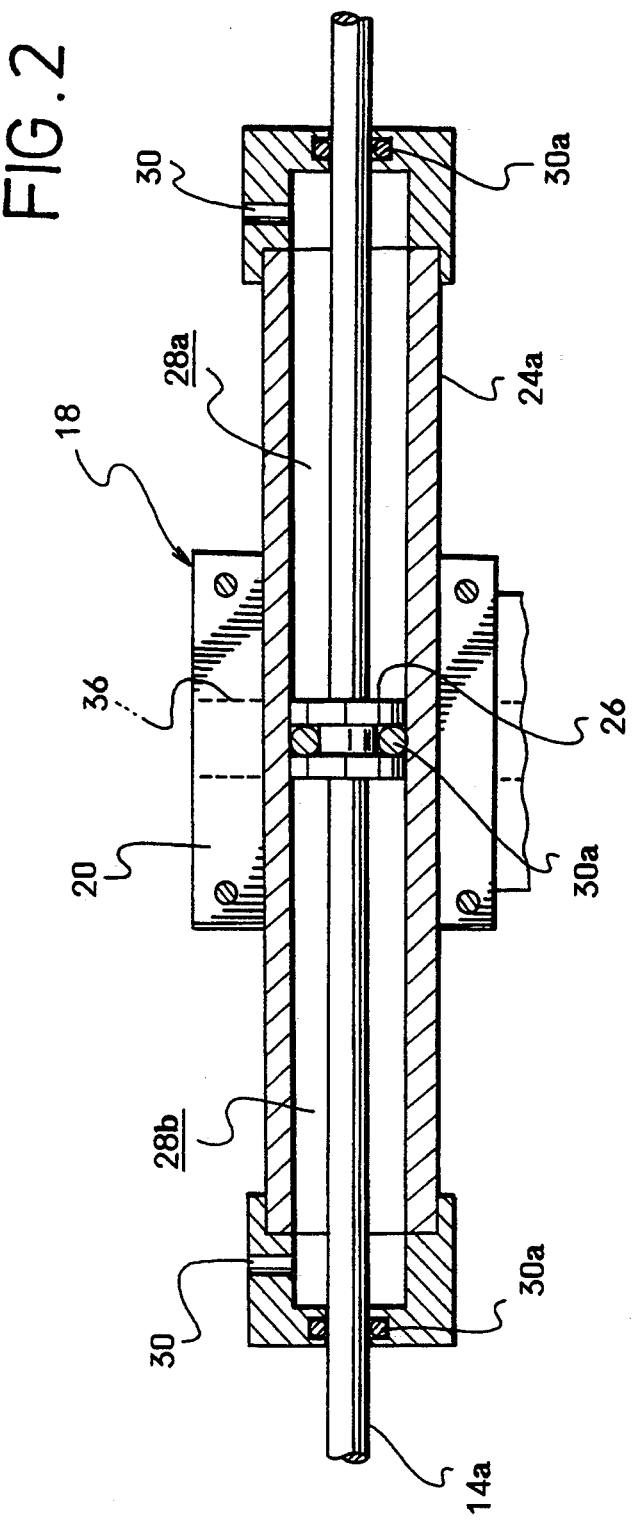
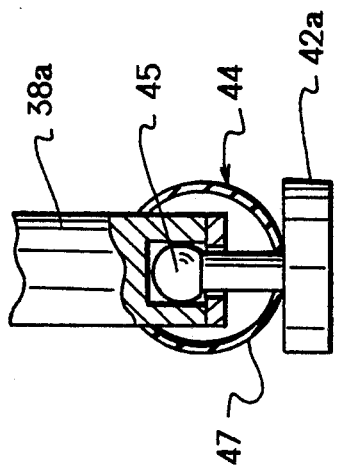
FIG. 2
FIG. 3

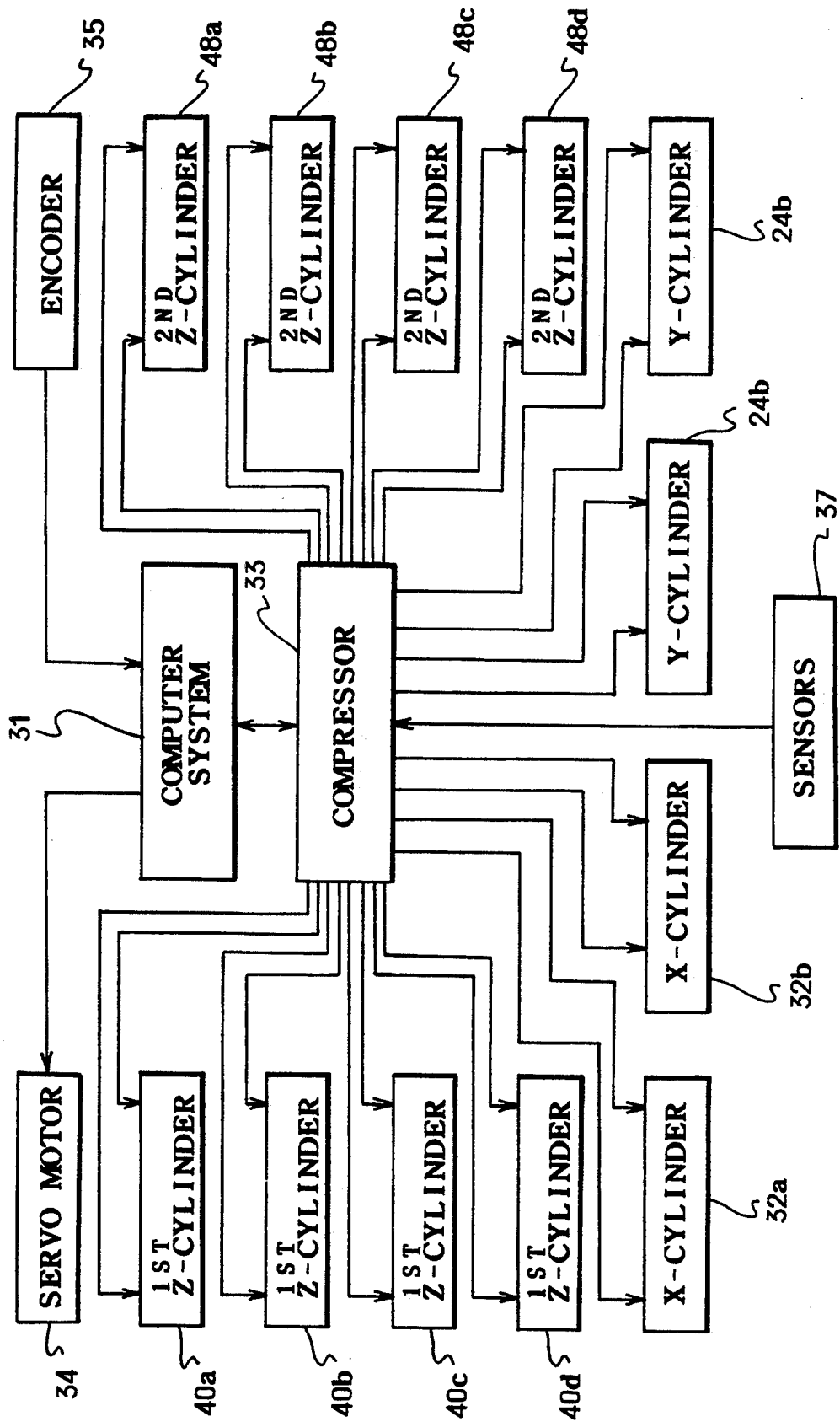

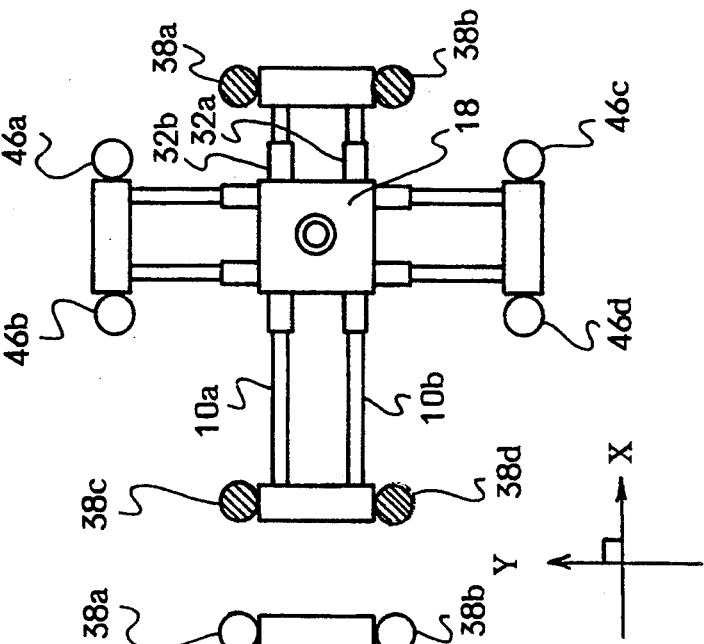
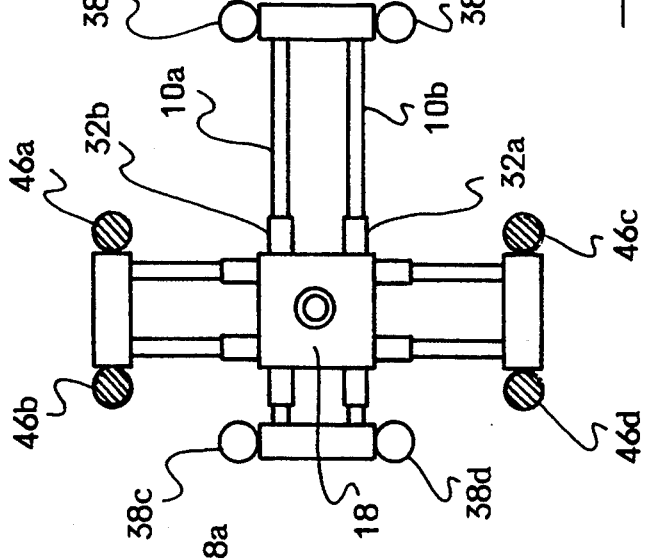
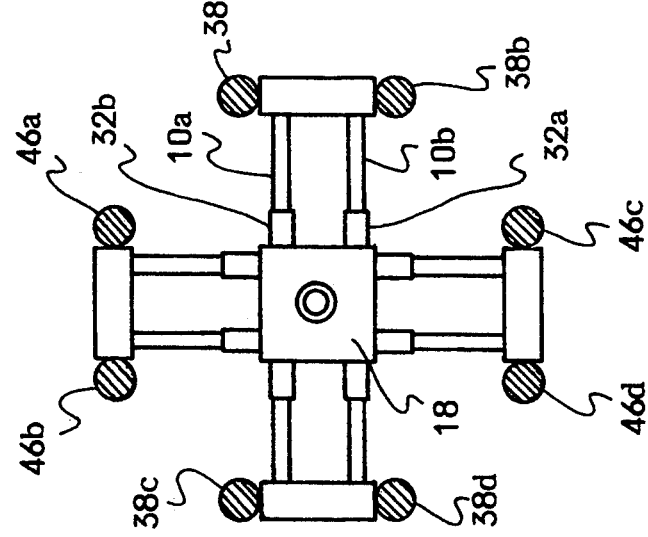

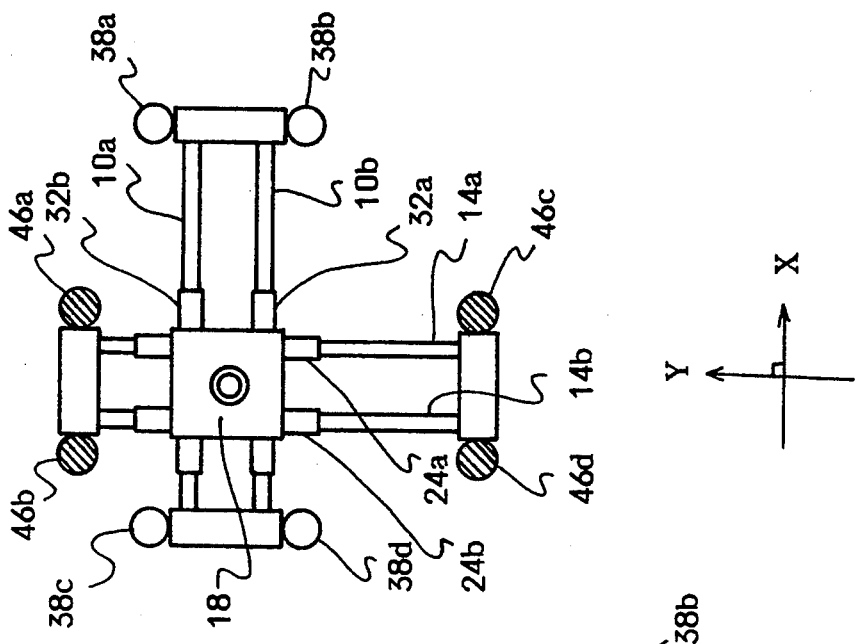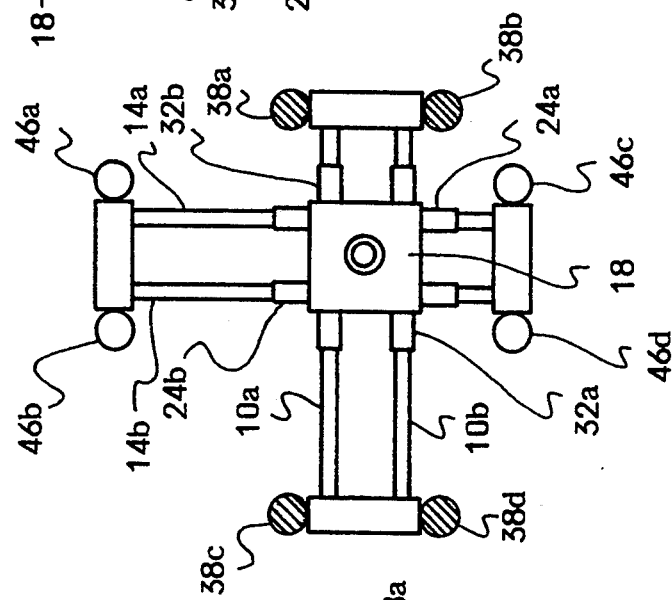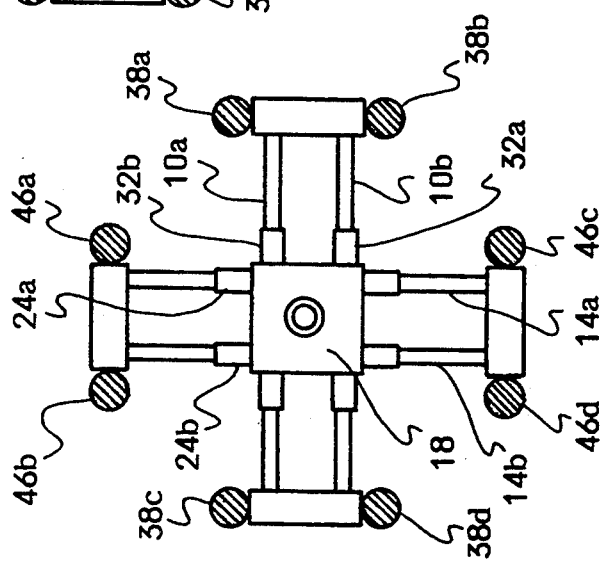

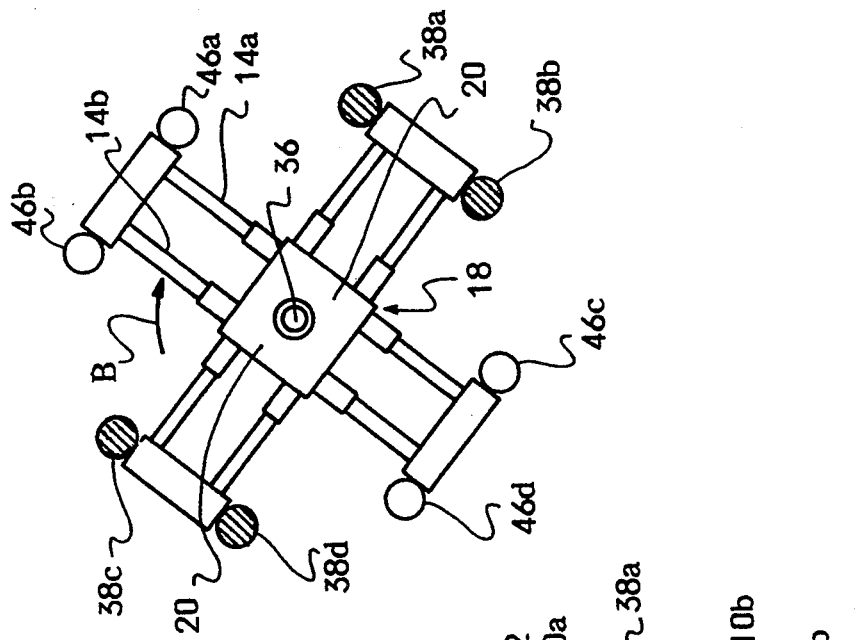
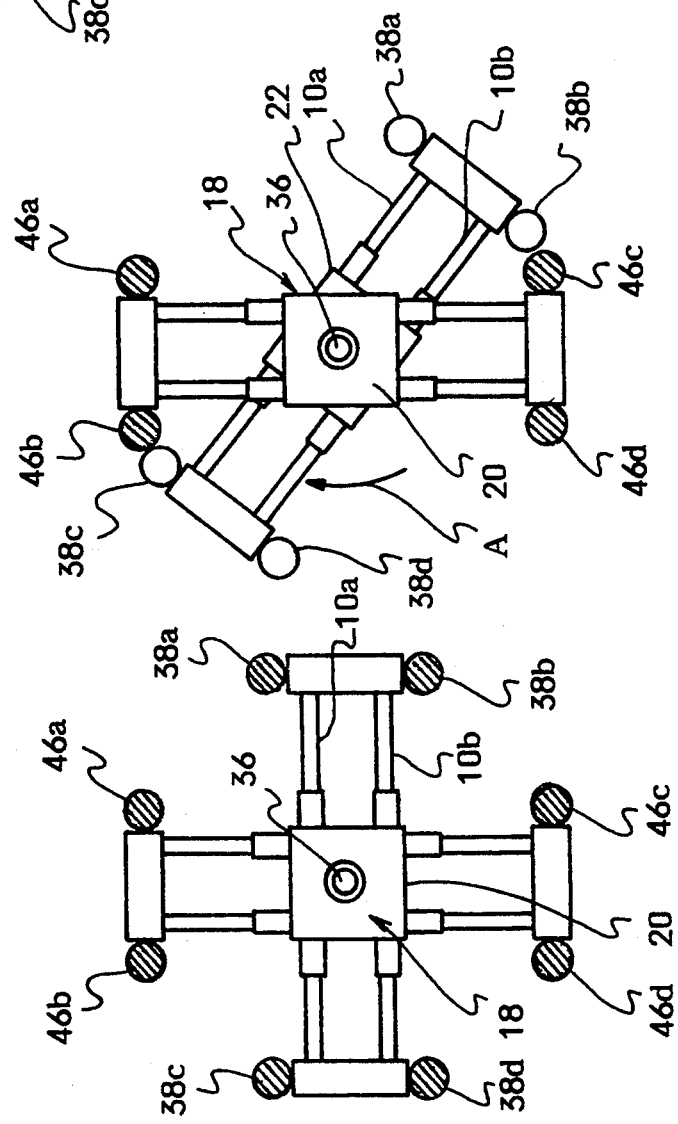
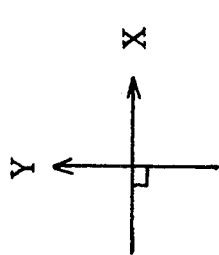

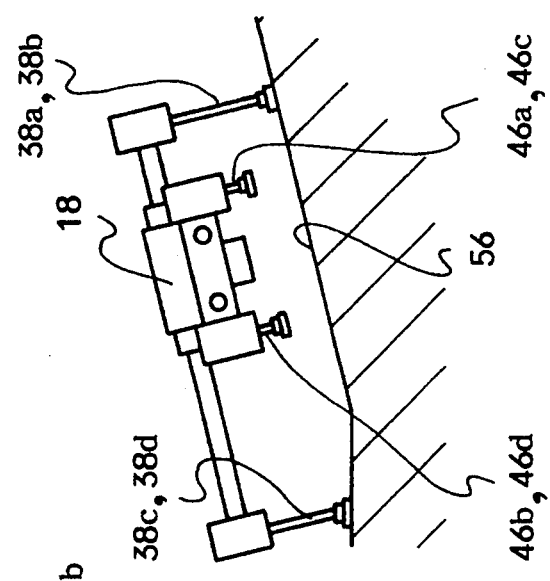
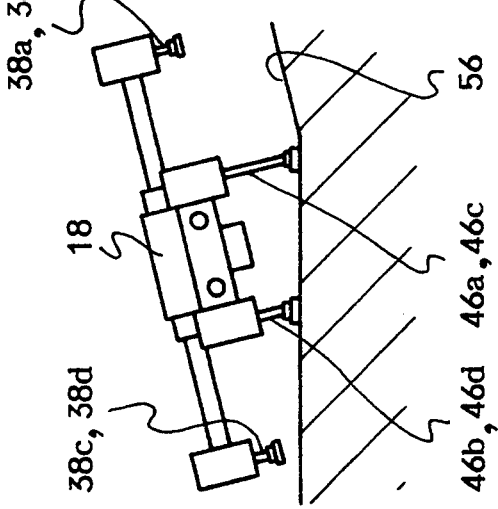
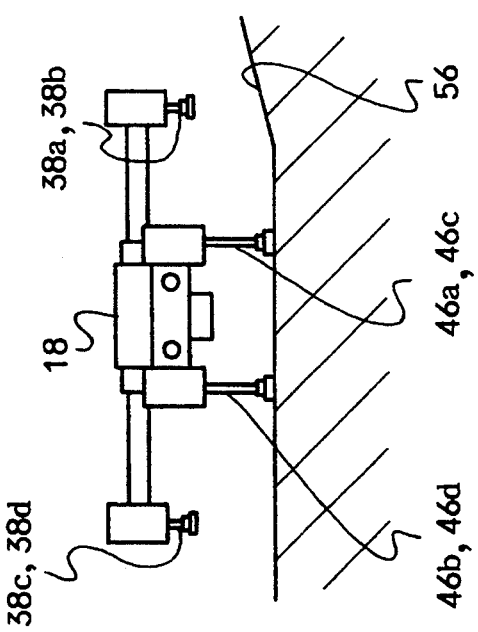

WALKING ROBOT

BACKGROUND OF THE INVENTION

1. Field of the Invention

The present invention relates to a walking robot, more precisely it relates to a walking robot, whose moving body is moved by leg sections.

2. Description of Related Art

Conventionally, self-propelled robots have been used for conveying cargo and the like. They have tires, crawlers, etc. as travelling means. In laboratories, four-legged walking robots, which are capable of walking like animals, and two-legged walking robots, which are capable of walking like human beings, are studied. The conventional walking robots have several joints in each leg, and the joints are moved by motors.

However, there are some disadvantages in the conventional self-propelled robots and walking robots In case of an obstruction existing on a course, the conventional robot having tires or crawlers as travelling means must change its moving direction so as to avoid the obstruction. Therefore, the conventional robot cannot the obstruction if the course is quite narrow.

On the other hand, in case of the conventional walking robot, it is very difficult to maintain its balance during operation. There must be states in which the robot is supported by three or one leg, so balance control must be very difficult even by a computer system. Therefore, walking robots have not put to practical use.

SUMMARY OF THE INVENTION

An object of the present invention is to provide a walking robot, which is easily capable of avoiding an obstruction and balancing during a walk.

To achieve the object, the walking robot of the present invention comprises:

an X-elongated member being provided in an X-direction;

a Y-elongated member being provided in a Y-direction perpendicular to the X-direction;

a moving body being capable of moving on the X-elongated member in the X-direction and on the Y-elongated member in the Y-direction;

an X-leg section being provided to the X-elongated member, the X-leg section being capable of extending and shortening its length in a Z-direction perpendicular to the X- and the Y-directions, wherein, in a supporting state, the X-leg section is capable of supporting the X-elongated member, the Y-elongated member and the moving body;

a Y-leg section being provided to the Y-elongated member, the Y-leg section being capable of extending and shortening its length in the Z-direction, wherein, in a supporting state, the Y-leg section is capable of supporting the X-elongated member, the Y-elongated member and the moving body;

an X-driving mechanism for relatively moving the moving body in the X-direction with respect to the X-elongated member;

a Y-driving mechanism for relatively moving the moving body in the Y-direction with respect to the Y-elongated member;

a first Z-driving mechanism for extending and shortening the X-leg section in the Z-direction; and a second Z-driving mechanism for extending and shortening the Y-leg section in the Z-direction.

In the walking robot of the present invention, the X- and the Y-leg sections, which support the moving body and the X- and the Y-elongated members, are capable of extending and shortening their length in the Z-direction, so the robot is able to stride over obstructions on the course by extending the X- and the Y-leg sections, even if the robot is walking straight.

Furthermore, the moving body and the X- and the Y-elongated members can be supported by the X-leg section or the Y-leg section, so the moving body and the X- and the Y-elongated members can be moved to walk while the X-leg section or the Y-leg section supports them. The walking robot is easily balanced during a walk, so that computer control can be easier.

BRIEF DESCRIPTION OF THE DRAWINGS

Embodiments of the present invention will now be described by way of examples and with reference to the accompanying drawings, in which:

FIG. 2 is a sectional view of a Y-cylinder;

FIG. 3 is a partial sectional view of a first joint section;

FIG. 4 is a block diagram of a control system for driving mechanisms;

FIG. 5(*a*), (*b*) and (*c*) is an explanation view showing straight movement of the robot;

FIG. 6(*a*), (*b*) and (*c*) is an explanation view showing diagonal movement. of the robot;

FIG. 7(*a*), (*b*) and (*c*) is an explanation view showing rotational movement of a moving body;

FIG. 8(*a*), (*b*) and (*c*) is an explanation view showing walking on a slope;

DETAILED DESCRIPTION OF PREFERRED EMBODIMENTS

Figure 1:
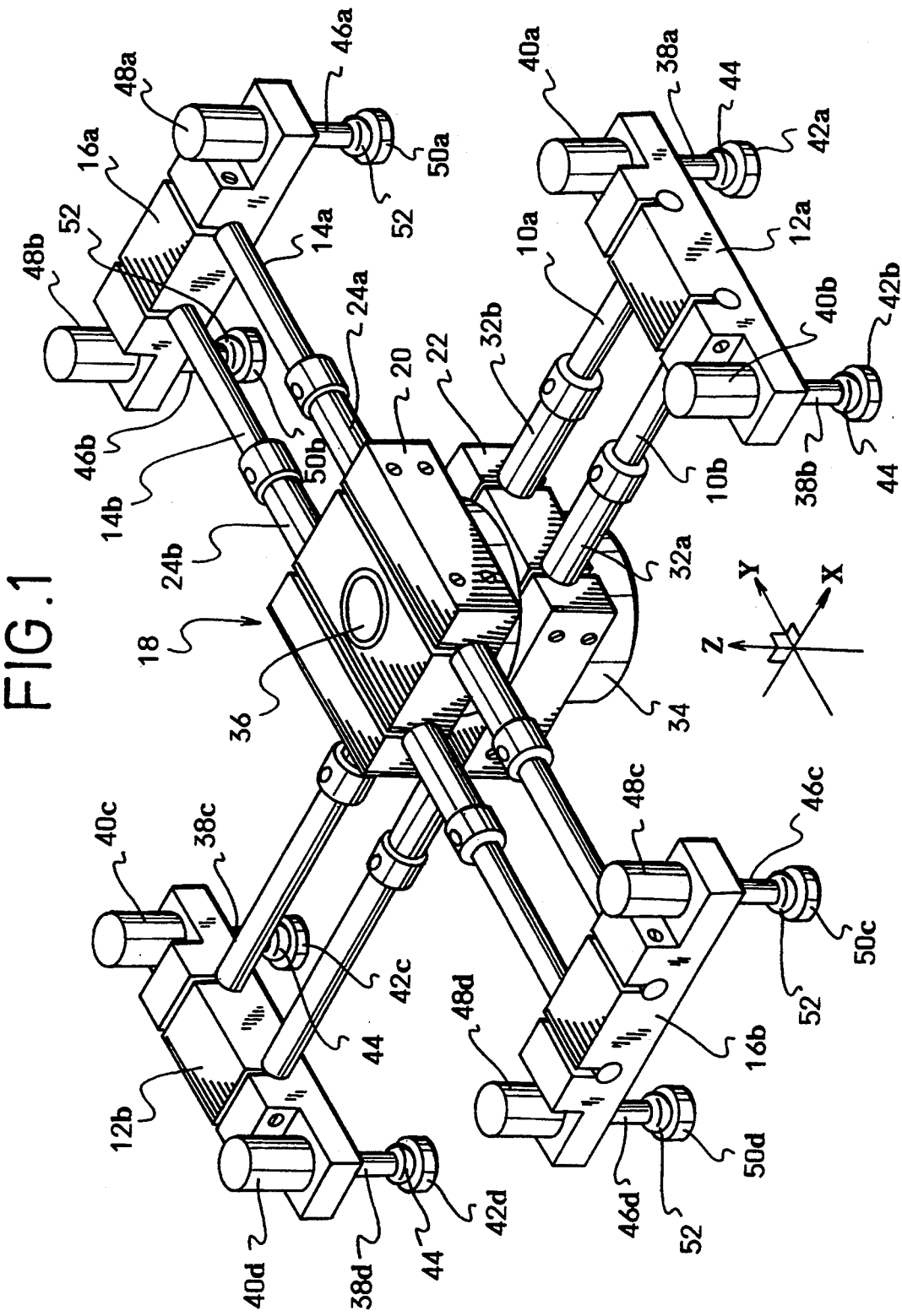
FIG. 1 is a perspective view of a walking robot of a first embodiment.

Preferred embodiments of the present invention will now be described in detail with reference to accompanying drawings. (First Embodiment)

The first embodiment will be explained with reference to FIGS. 1–10.

Structure will be explained with reference to FIGS. 1–4.

X-elongated members 10*a* and 10*b* are metal rods. The X-elongated members 10*a* and 10*b* are arranged in parallel in an X-direction.

X-connecting members 12*a* and 12*b* are respectively fixed at each end of the X-elongated members 10*a* and 10*b*. The X-connecting members 12*a* and 12*b* integrate the X-elongated members 10*a* and 10*b*.

Y-elongated members 14*a* and 14*b* are metal rods. The Y-elongated members 14*a* and 14*b* are arranged in parallel in a Y-direction perpendicular to the X-direction. The Y-elongated members 14a and 14b are provided above the X-elongated members 10a and 10b.

Y-connecting members 16a and 16b are respectively fixed at each end of the Y-elongated members 14a and 14b. The Y-connecting members 16a and 16b integrate the Y-elongated members 14a and 14b.

Moving body 18 has an upper part constituting member 20 and a lower part constituting member 22. Tools, measuring equipment and work can be attached to or mounted on the moving body 18.

Y-cylinders 24a and 24b are pierced through and fixed in the upper part constituting member 20 in the Y-direction. The Y-elongated members 14a and 14b are movably pierced through each Y-cylinder 24a and 24b. With this structure, the upper part constituting member 20 is capable of moving the Y-elongated members 14a and 14b in the Y-direction. This structure is explained with reference to FIG. 2.

FIG. 2 is a partial sectional view of a part of the Y-cylinder 24a. There is formed a piston section 26 on the center part of the Y-elongated member 14a. The diameter of the piston section 26 is greater than that of the Y-elongated member 14a. The piston section 26 divides an inner space of the Y-cylinder 24a into air chambers 28a and 28b. Compressed air is selectively introduced into and discharged from the air chambers 28a and 28b via air-ports 30. When compressed air is introduced into the air chamber 28a or 28b, the capacity of the air chamber 28a or 28b is increased, so that the Y-cylinder 24a, which is integrated with the upper part constituting member 20, moves to the side of the air chamber 28a or 28b, into which compressed air is introduced. Note that, there is provided a seal member 30a to the piston section 26 for air tight sealing between the air chambers 28a and 28b. The Y-cylinder 24b has the same structure. The Y-cylinders 24a and 24b are simultaneously moved in the same direction at the same speed by controlling introduction and discharge of compressed air. By compressed air, the upper part constituting member 20 or the moving body 18 can be moved in the Y-direction.

X-cylinders 32a and 32b are pierced through and fixed in the lower part constituting member 22 in the X-direction. The X-elongated members 10a and 10b are movably pierced through each X-cylinder 32a and 32b. With this structure, the lower part constituting member 22 is capable of moving on the X-elongated members 10a and 10b in the X-direction. The structure of the lower part constituting member 22 including the X-cylinders 32a and 32b is the same as that of the upper part constituting member 20, so the explanation will be omitted. The X-cylinders 32a and 32b are simultaneously moved in the same direction at the same speed by controlling introduction and discharge of compressed air. By compressed air, the lower part constituting member 22 or the moving body 18 can be moved in the X-direction. With the above described Y-driving mechanism, which includes the Y-cylinders 24a and 24b for moving the moving body 18 in the Y-direction, and an X-driving mechanism, which includes the X-cylinders 32a and 32b for moving the moving body 18 in the X-direction, the moving body 18 can execute the X-Y movement by selective introduction and discharge of compressed air.

A DC servo motor 34, which is an example of rotary driving means, is provided to the lower part constituting member 22. The servo motor 34 has the upper part constituting member 20 turn with respect to the lower part constituting: member 22. The upper part constituting member 20 is turned on its own axis. The upper part constituting member 20 and the lower part constituting member 22 are rotatably connected by a rotary shaft 36. The rotary shaft 36 is turned by the servo motor 34. A mutual rotational angle between the upper part constituting member 20 and the lower part constituting member 22 can be detected by an encoder (described later). Note that other rotary actuators such as a cylinder mechanism, can be used as the rotary driving means.

Each X-connecting member 12a and 12b respectively has two X-leg sections 38a, 38b and 38c, 38d. The X-leg sections 38a, 38b, 38c and 38d are piston rods of first Z-cylinder units 40a, 40b, 40c and 40d, which are fixed at the X-connecting members 12a and 12b. The X-leg sections 38a, 38b, 38c and 38d are capable of extending and shortening in a Z-direction perpendicular to the X- and the Y-directions. When the X-leg sections 38a, 38b, 38c and 38d are in a supporting state, the X-leg sections 38a, 38b, 38c and 38d are capable of supporting the moving body 18, the X-elongated members 10a and 10b, the Y-elongated members 14a and 14b and the servo motor 34. Compressed air is independently introduced into and discharged from the first Z-cylinder units 40a, 40b, 40c and 40d so as to independently extend and shorten the X-leg sections 38a, 38b, 38c and 38d. Note that, in the present invention, the first Z-cylinder units 40a, 40b, 40c and 40d are first Z-driving mechanisms.

First grounding sections 42a, 42b, 42c and 42d are respectively provided to the lower ends of the X-leg sections 38a, 38b, 38c and 38d. When the X-leg sections 38a, 38b, 38c and 38d are in the supporting state, the first grounding sections 42a, 42b, 42c and 42d are touching on the ground, floors, or other support surface. Note that there are provided first joint sections 44 between the X-leg sections 38a, 38b, 38c and 38d and the first grounding sections 42a, 42b, 42c and 42d . The first joint sections 44 have ball joints (see FIG. 3), which are covered with bellows 47. With the ball joints 45, the first grounding sections 42a, 42b, 42c and 42d are able to grip the ground surface even on slopes and uneven ground. Note that universal joints can be used instead of the ball joints 45.

Each Y-connecting member 16a and 16b respectively has two Y-leg sections 46a, 46b and 46c, 46d. The Y-leg sections 46a, 46b, 46c and 46d are piston rods of second Z-cylinder units 48a, 48b, 48c and 48d, which are fixed at the Y-connecting members 16a and 16b. The Y-leg sections 46a, 46b, 46c and 46d are capable of extending and shortening in the Z-direction. When the Y-leg sections 46a, 46b, 46c and 46d are in the supporting state, the Y-leg sections 46a, 46b, 46c and 46d are capable of supporting the moving body 18, the X-elongated members 10a and 10b, the Y-elongated members 14a and 14b and the servo motor 34. Compressed air is independently introduced into and discharged from the second Z-cylinder units 48a, 48b, 48c and 48d so as to independently extend and shorten the Y-leg sections 46a, 46b, 46c and 46d. Note that, in the present invention, the second Z-cylinder units 48a, 48b, 48c and 48d are second Z-driving mechanisms.

Second grounding sections 50a, 50b, 50c and 50d are respectively provided to the lower ends of the Y-leg sections 46a, 46b, 46c and 46d. When the Y-leg sections 46a, 46b, 46c and 46d are in the supporting state, the second grounding sections 50a, 50b, 50c and 50d are touching on the ground, floors, or other support surface. Note that there are provided second joint sections 52 between the Y-leg sections 46a, 46b, 46c and 46d and the second grounding sections 50a, 50b, 50c and 50d. The second joint sections 52 have ball joints (not shown), which are covered with bellows, as well as the first joint sections 44. With the ball joints in the second joint sections 52, the second grounding sections 50a, 50b, 50c and 50d are able to grip the ground surface even on slopes and uneven ground. Note that, universal joints can be used instead of the ball joints of the second joint sections 52.

The walking robot of the present embodiment is controlled by a computer system as control means. The computer system is explained with reference to FIG. 4.

A computer system 31 controls a compressor 33. The compressor 33 supplies compressed air to the X-cylinders 32a and 32b, the Y-cylinders 24a and 24b, the first Z-cylinders 40a, 40b, 40c and 40d and the second Z-cylinders 48a, 48b, 48c and 48d. The computer system 31 also controls the servo motor 34. The computer system 31 detects the rotational angle of the servo motor 34 by an encoder 35 for controlling the servo motor 34.

Furthermore, the computer system 31 detects the locations of the X-cylinders 32a and 32b with respect to the X-elongated members 10a and 10b, the locations of the Y-cylinders 24a and 24b with respect to the Y-elongated members 14a and 14b, the locations of the first grounding sections 42a, 42b, 42c and 42d with respect to the Z-axis, and the locations of the second grounding sections 50a, 50b, 50c and 50d with respect to the Z-axis by a plurality of sensors 37 so as to obtain walking data of the robot.

Successively, the action of the robot will be explained.

Firstly, the rectilinear walking is explained with reference to FIG. 5. Note that the X-leg sections 38a, 38b, 38c and 38d and the Y-leg sections 46a, 46b, 46c and 46d shown as black circles (●) are in the supporting state; the X-leg sections 38a, 38b, 38c and 38d and the Y-leg sections 46a, 46b, 46c and 46d shown as white circles (◯)) are in the non-supporting state.

In FIG. 5 (a), all of the X-leg sections 38a, 38b, 38c and 38d and the Y-leg sections 46a, 46b, 46c and 46d are in the supporting state, so the robot is standing still. In this state, the X-leg sections 38a, 38b, 38c and 38d are shortened to be in the non-supporting state. Then compressed air is selectively supplied to the X-cylinders 32a and 32b to move the X-elongated members 10a and 10b rightward (see FIG. 5 (b)). After the X-elongated members 10a and 10b are moved rightward, the X-leg sections 38a, 38b, 38c and 38d are extended to be in the supporting state, so that all of the X-leg sections 38a, 38b, 38c and 38d and the Y-leg sections 46a, 46b, 46c and 46d are in the supporting state. Next, the Y-leg sections 46a, 46b, 46c and 46d are shortened to be in the non-supporting state, and compressed air is selectively supplied to the X-cylinders 32a and 32b to move the moving body 18 rightward (see FIG. 5 (c)). By repeating above described sequential steps, the moving body 18 can be linearly moved in the X-direction. The moving body 18 also can be moved in the Y-direction in a similar manner.

Next, diagonal walking is explained with reference to FIG. 6.

In FIG. 6 (a), all of the X-leg sections 38a, 38b, 38c and 38d and the Y-leg sections 46a, 46b, 46c and 46d are in the supporting state, so the robot is standing still. In this state, tile Y-leg sections 46a, 46b, 46c and 46d are shortened to be the non-supporting state. Then compressed air is selectively supplied to the X-cylinders 32a and 32b to move the moving body 18 rightward, and compressed air is selectively supplied to the Y-cylinders 24a and 24b to move the Y-elongated members 14a and 14b upward (see FIG. 6 (b)). Then the Y-leg sections 46a, 46b, 46c and 46d are extended to be the supporting state, so that all of the X-leg sections 38a, 38b, 38c and 38d and the Y-leg sections 46a, 46b, 46c and 46d are in the supporting state. Next, the X-leg sections 38a, 38b, 38c and 38d are shortened to be in the non-supporting state, and compressed air is selectively supplied to the Y-cylinders 24a and 24b to move the moving body 18 upward and to the X-cylinders 32a and 32b to move the X-elongated members 10a and 10b rightward (see FIG. 6 (c)). By repeating above described sequential steps, the moving body 18 can be diagonally moved. Namely, the diagonal movement is realized by combination of the rectilinear movement in the X- and the Y-directions. Moreover, a change of direction can be executed by the combination thereof.

Next, the rotation of the moving body 18 is explained with reference to FIG. 7.

In FIG. 7 (a), all of the X-leg sections 38a, 38b, 38c and 38d and the Y-leg sections 46a, 46b, 46c and 46d are in the supporting state, so the robot is standing still. In this state, the X-leg sections 38a, 38b, 38c and 38d are shortened to be in the non-supporting state. Then the servo motor 34 is driven so as to rotate the lower constituting member 22 and the X-elongated members 10a and 10b in the direction of an arrow A (see FIG. 7 (b)). After the lower constituting member 22 and the X-elongated members 10a and 10b are rotated, the X-leg sections 38a, 38b, 38c and 38d are extended to be the supporting state, so that all of the X-leg sections 38a, 38b, 38c and 38d and the Y-leg sections 46a, 46b, 46c and 46d are in the supporting state. Successively, the Y-leg sections 46a, 46b, 46c and 46d are shortened to be the non-supporting state. Then the servo motor 34 is driven so as to rotate the upper constituting member 20 and the Y-elongated members 14a and 14b in the direction of an arrow B (see FIG. 7 (c)). By driving the servo motor 34, the moving body 18 has been rotated about 45 degrees. By repeating above described sequential steps, the moving body 18 can be rotated. Note that, the rotational angle of the moving body 18 can be controlled by controlling the servo motor 34 on the basis of the data detected by the encoder 35.

Next, walking on a slope is explained with reference to FIG. 8.

In FIG. 8 (a), the walking robot has been proceeding rightward and the robot is short of a slope 56. The X-leg sections 38a, 38b, 38c and 38d are in the non-supporting state; the Y-leg sections 46a, 46b, 46c and 46d are in the supporting state. To climb up the slope 56, the moving body 18 is required to incline until the moving body 18 is approximately parallel to the surface of the slope 56. Therefore, the length of the Y-leg sections 46a and 46c, which are on the slope 56 side, is extended to be longer than that of the Y-leg sections 46b and 46d, so that the moving body 18 becomes approximately parallel to the surface of the slope 56 (see FIG. 8 (b)). If the robot continues to linearly walk maintaining this state, the walking robot is able to linearly climb up the slope 56. At that time, there are ball joints in the first joint sections 44 and the second joint sections 52, so that, the first grounding sections 42a, 42b, 42c and 42d and the second grounding sections 50a, 50b, 50c and 50d are able to certainly grip the surface of the slope 56. Note that, in case of a steep slope, it is difficult to balance, so the robot is able to climb up the steep slope by making a zigzag track. There are provided the sensors 37, which detect the distance to the ground surface, to the X-leg sections 38a, 38b, 38c and 38d and the Y-leg sections 46a, 46b, 46c and 46d, so that the length of the X-leg sections 38a, 38b, 38c and 38d and the Y-leg sections 46a, 46b, 46c and 46d can be precisely controlled by the computer system 31.

Figure 9:
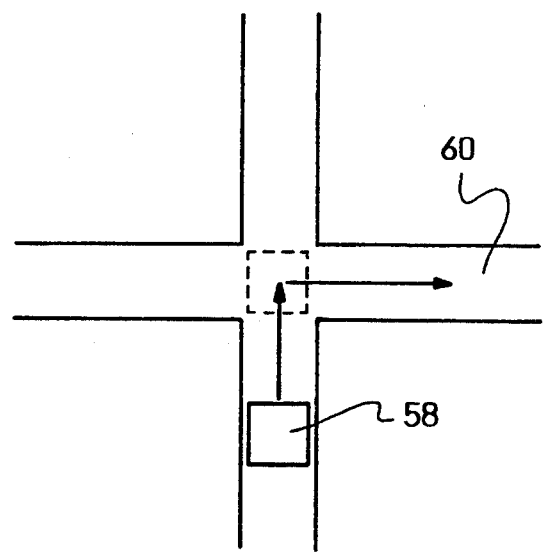
FIG. 9 is an explanation view showing turning in another direction.

Next, the change of course is explained with reference to FIG. 9.

In case that a conventional robot, which has, for example, tires as travelling means, changes its course at a right angle, the track of the inside tires is different from that of the outside tires. Because of the track difference, the width of the course must be greater than that of the robot. However, in the walking robot of the present embodiment, the robot 58 is able to immediately change its heading from the X-direction to the Y-direction. Therefore, the robot 58 has no disadvantage of the track difference, so that the robot 58 is able to go in to the narrow course 60 whose width is almost the same as that of the robot 58. Furthermore, because the moving body 18 is capable of turning as shown in FIG. 7, the robot 58 is able to change courses at an acute angle.

Next, walking on an uneven ground or over an obstruction is explained with reference to FIG. 10.

Figure 10:
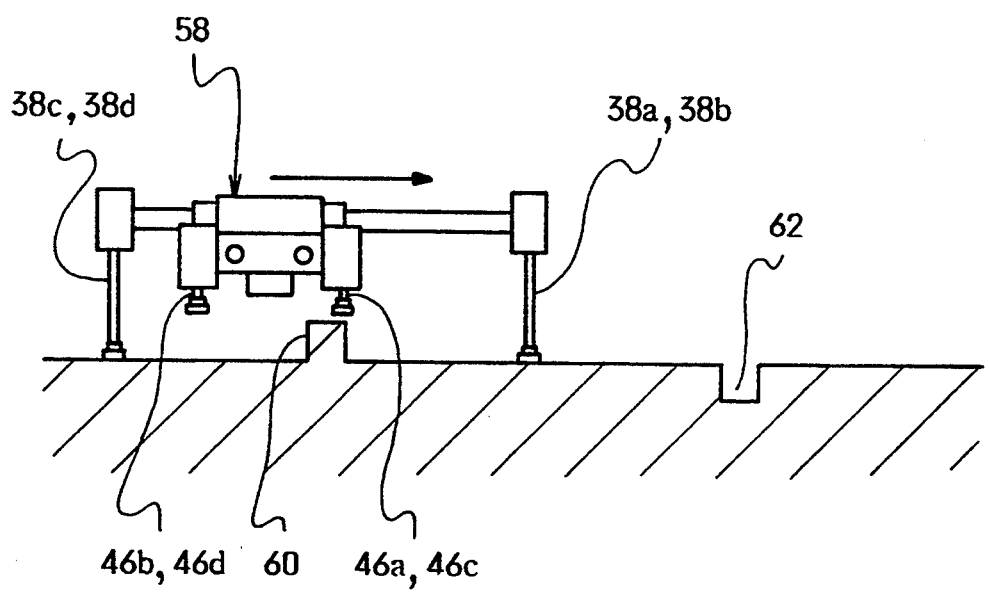
FIG. 10 is an explanation view showing walking on an uneven course.

In FIG. 10, the walking robot 58 has been proceeding rightward. There is a projection 61 and a cavity 62 on the ground. By extending and shortening the X-leg sections 38a, 38b, 38c and 38d and the Y-leg sections 46a, 46b, 46c and 46d, the moving body 18 is capable of striding over the projection 61 and the cavity 62. Therefore, interference by the projection 61 and falling into the cavity 62 can be prevented.

If distance measuring sensors (not shown), which are capable of continuously measuring the distance between the X- and the Y-connecting members 12a, 12b, 16a and 16b and the X- and the Y-leg sections 38a, 38b, 38c, 38d, 46a, 46b, 46c and 46d, are provided to the X- and the Y-connecting members 12a, 12b, 16a and 16b, the computer system 31 is capable of horizontally maintaining the upper face of the moving body 18. Therefore, for example, the walking robot may be capable of climbing stairs without spilling liquid in a container. The walking robot of the present invention can be used for a conveying robot or an unmanned robot which is capable of working in dangerous environments, and the like.

In the present embodiment, air cylinder units and a servo motor are used as driving other means such as hydraulic cylinder units, ball bearing screws, and cylinder-link mechanisms, can be used as the driving means. Especially, hydraulic cylinder units having control valves, which are capable of adjusting an amount of oil flow, and ball bearing screws are capable of highly precise control. Driving means may be selected according to uses, environments in which the walking robot is operated, and the like.

(Second Embodiment)

Figure 11:
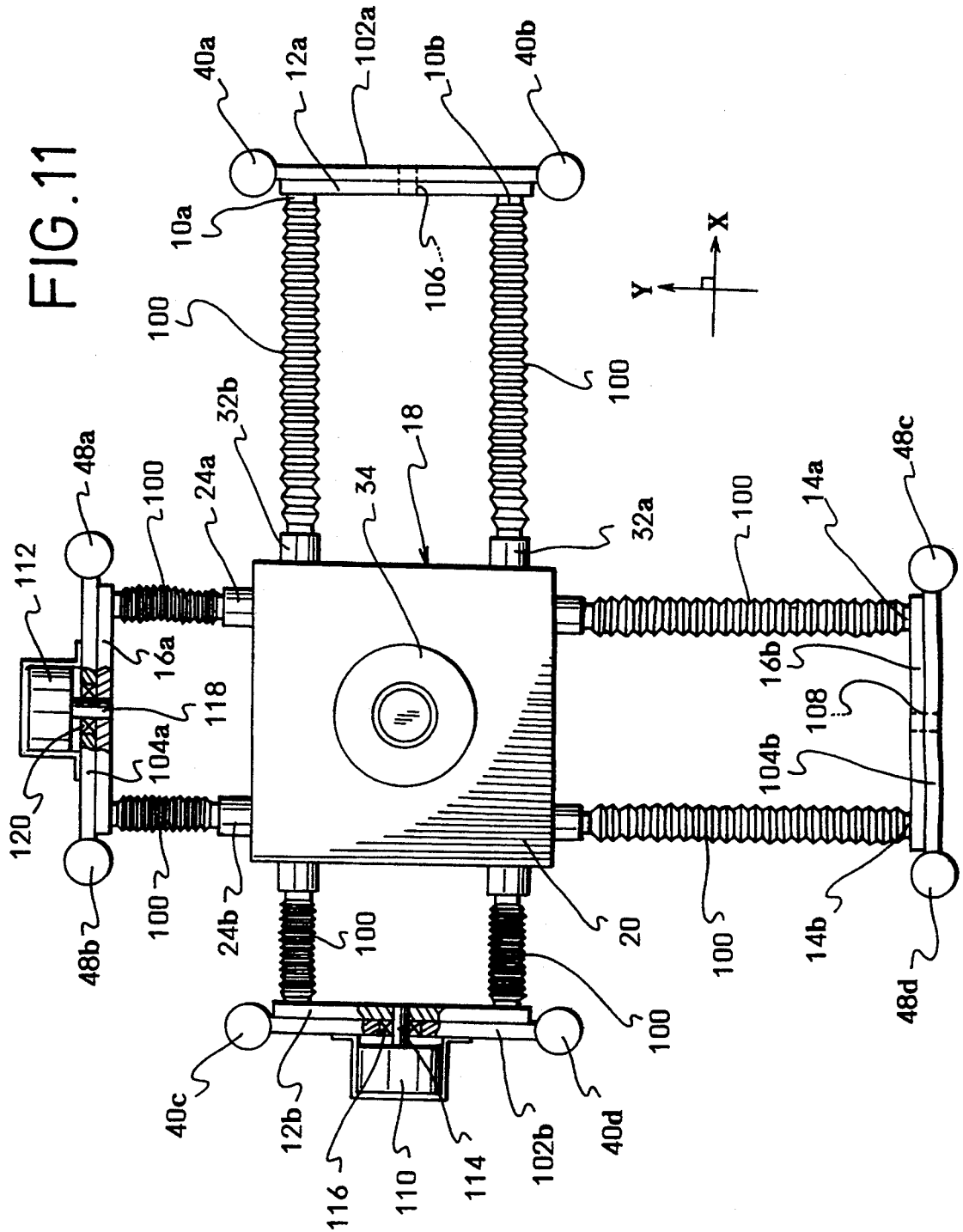
FIG. 11 is a plan view of a walking robot of a Second Embodiment.

The second embodiment will be explained with reference to FIGS. 11 and 12. Elements which have been explained in the first embodiment are assigned the same symbols, and explanation will be omitted.

The X-elongated members 10a and 10b, which are pierced through the X-cylinders 32a and 32b are covered with bellows 100.

The servo motor 34, which is an example of the rotary driving means, is provided on the upper constituting member 20 of the moving body 18. Therefore, in the second embodiment, the lower constituting member 22 is rotated with respect to the upper constituting member 20.

The first Z-cylinder units 40a and 40b are respectively fixed at each end of a cylinder plate 102a; the first Z-cylinder units 40c and 40d are respectively fixed at each end of a cylinder plate 102b.

The second Z-cylinder units 48a and 48b are respectively fixed at each end of a cylinder plate 104a; the second Z-cylinder units 48c and 48d are respectively fixed at each end of a cylinder plate 104b.

The X-connecting member 12a and the cylinder plate 102a are rotatably connected by a shaft 106.

The Y-connecting member 16b and the cylinder plate 102b are rotatably connected by a shaft 108.

A servo motor 110, which is an example of first inclining means, is fixed at the cylinder plate 102b. A motor shaft 114 of the servo motor 110 is rotatably pierced through the cylinder plate 102b with a bearing 116, and its front end is fixed to the X-connecting member 12b. By this structure, when the first ground sections 42a, 42b, 42c and 42d grip the ground surface, the moving body 18 is inclined with respect to the cylinder plates 102a and 102b by driving the servo motor 110 (see FIG. 12).

A servo motor 112, which is an example of second inclining means, is fixed at the cylinder plate 104a. A motor shaft 118 of the servo motor 112 is rotatably pierced through the cylinder plate 104a with a bearing 120, and its front end is fixed to the Y-connecting member 16a. By this structure, when the second ground sections 50a, 50b, 50c and 50d grip the ground surface, the moving body 18 is inclined with respect to the cylinder plates 104a and 104b by driving the servo motor 112. Alternatively, when the first ground sections 42a, 42b, 42c, and 42d grip the ground surface (FIG. 12), the moving body 18 is inclined with respect to the cylinder plates 102a and 102b by driving the servo motor 110.

Figure 12:
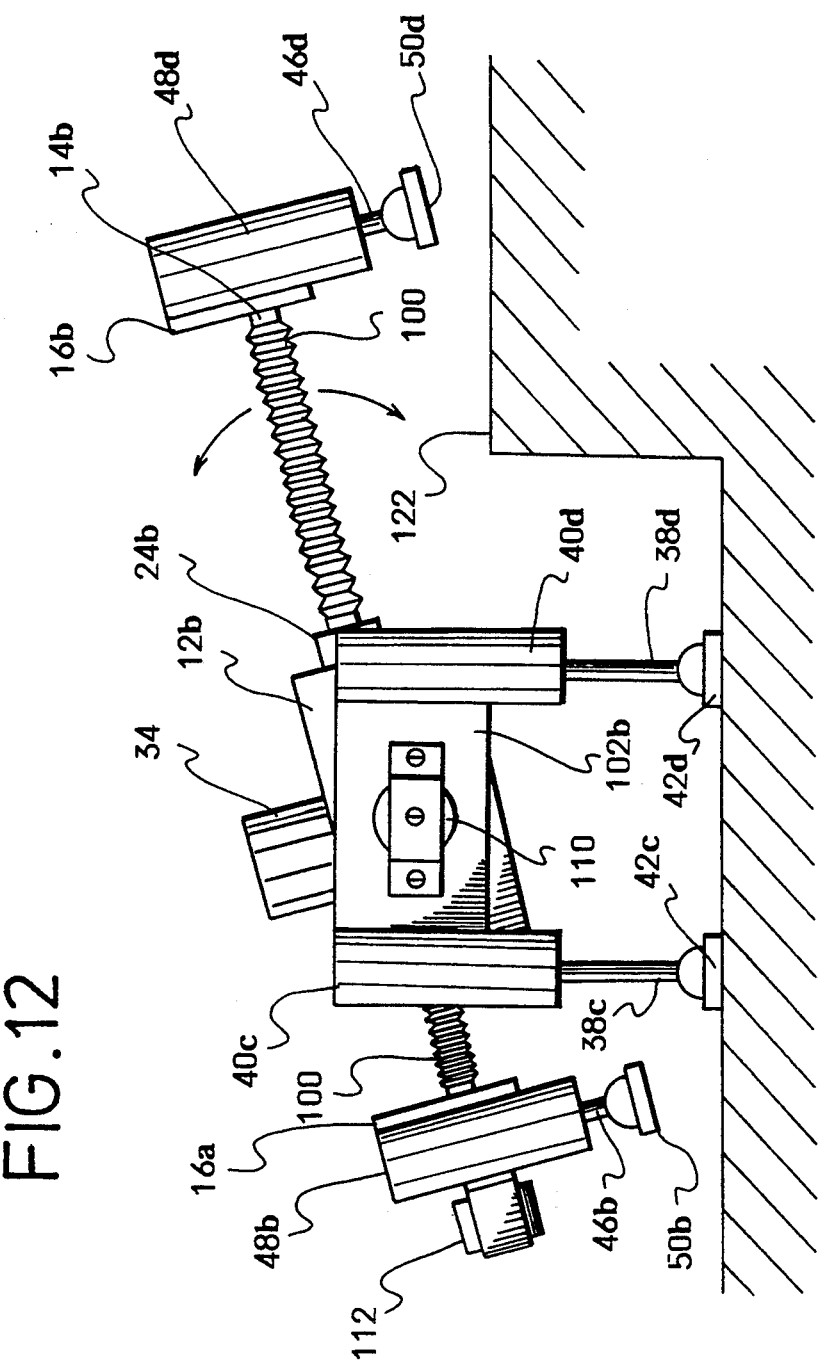
FIG. 12 is a side view showing the action of the walking robot of the a second embodiment.

By driving the servo motors 110 and 112, the walking robot is capable of climbing and descending stairs 122 as shown in FIG. 12.

Note that other means such as cylinder-link mechanisms, can be used as the first and the second inclining means instead of the servo motors 110 and 112. The first and the second inclining means also can be controlled by the computer system.

(Third Embodiment)

Figure 13:
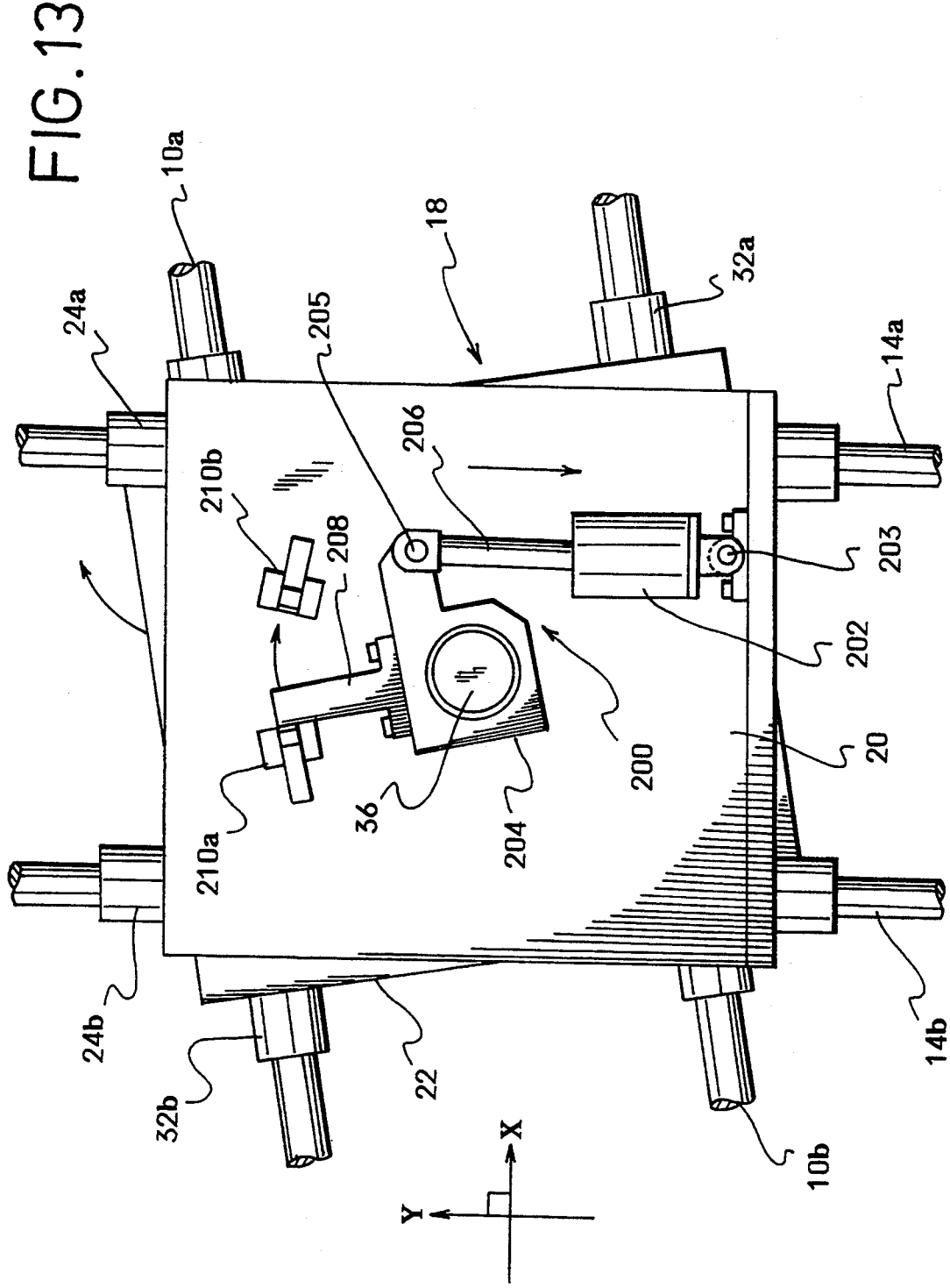
FIG. 13 is a partial plan view of a walking robot of a third embodiment.

The third embodiment will be explained with reference to FIG. 13. Elements which have been explained in the first embodiment are assigned the same symbols, and explanation will be omitted.

In the present embodiment, a cylinder-link mechanism 200 is used as the rotary driving means. The cylinder-link mechanism 200 is provided on the upper face of the upper constituting member 20. The cylinder-link mechanism 200 has an air cylinder unit 202 and a rotary member 204.

A rear end of the air cylinder unit 202 is rotatably attached to the upper constituting member 20 by a pin 203. A front end of a rod 206 of the air cylinder unit 202 is rotatably connected to the rotary member 204 by a pin 205. The rotary member 204 is fixed at the shaft 36, which is integrated with the lower constituting member 22. With this structure, the rotary member 204 is rotated by the rod 206, which is extended and shortened by the air cylinder unit 202. The lower constituting member 22 is rotated with the shaft 36.

A lever section 208 is fixed at the rotary member 204. The lever section 208 is rotated with the rotary member 204, and is capable of contact with stoppers 210a and 210b, which are fixed on the upper face of the upper constituting member 20. Therefore, the lower constituting member 22 is capable of rotating with respect to the upper constituting member 20 within the angle in which the lever section 208 contacts the stoppers 210a and 210b.

The cylinder-link mechanism 200 may be controlled by a computer system.

(Fourth Embodiment)

The fourth embodiment will be explained with reference to FIG. 14. Elements which have been explained in the first embodiment are assigned the same symbols, and explanation will be omitted.

Figure 14:
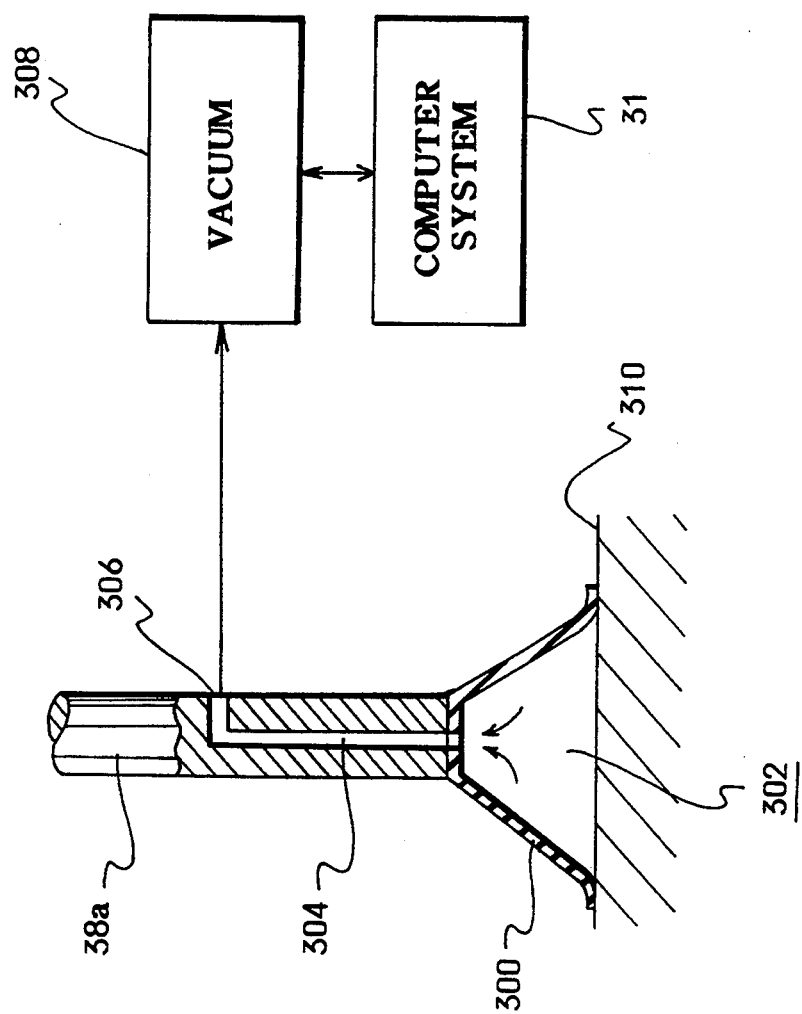
FIG. 14 is a sectional view of an X-leg section of a fourth embodiment.

FIG. 14 shows a partial sectional view of the lower end section of the X-leg section 38a.

At the lower end, the X-leg section 38a has an elastic sucking pad 300 instead of the first grounding section 42a.

There is formed an air path 304, whose one end is opened at the outer circumferential face of the X-leg section 38a and the other end is opened at the lower end thereof, in the X-leg section 38a. The air path 304 is further connected to an inner space 302 of the sucking pad 300, The one end of the air path 304 is an air-port 306.

A vacuum generator 308 is connected to the air-port 306 by an air tube (not shown).

The X-leg sections 38b, 38c and 38d and the Y-leg sections 46a, 46b, 46c and 46d , as well as the X-leg section 38a, have the sucking pads 300, and the sucking pads 300 are respectively connected to the vacuum generator 308.

The vacuum generator 308 is controlled by the computer system 31. For example, the computer system 31 controls the vacuum generator 308 to make the inner spaces 302 of the sucking pads 300 of the selected X- and Y-leg sections, which contact the ground 310, negative pressure condition. By this control, even if the ground 310 is a vertical wall or an overhanging wall, the walking robot can walk on the surface without falling therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A walking robot comprising:
    an X-elongated member being provided in an X-direction;
    a Y-elongated member being provided in a Y-direction perpendicular to the X-direction;
    a moving body being capable of moving on said X-elongated member in the X-direction and on said Y-elongated member in the Y-direction;
    an X-leg section being provided to said X-elongated member, said X-leg section being capable of extending and shortening its length in a Z-direction perpendicular to the X- and the Y-directions, wherein, in a supporting state, said X-leg section is capable of supporting said X-elongated member, said Y-elongated member and said moving body;
    a Y-leg section being provided to said Y-elongated member, said Y-leg section being capable of extending and shortening its length in the Z-direction, wherein, in a supporting state, said Y-leg section is capable of supporting said X-elongated member, said Y-elongated member and said moving body;
    an X-driving mechanism for relatively moving said moving body in the X-direction with respect to said X-elongated member;
    a Y-driving mechanism for relatively moving said moving body in the Y-direction with respect to said Y-elongated member;
    a first Z-driving mechanism for extending and shortening said X-leg section in the Z-direction;
    a second Z-driving mechanism for extending and shortening said Y-leg section in the Z-direction;
    first including means for inclining said moving body, said X-elongated member, said Y-elongated member, said Y-leg section, said X-driving mechanism, said Y-driving mechanism and said second Z-driving mechanism with respect to said X-leg section when said X-leg section is in the supporting state;
    second inclining means for inclining said moving body, said X-elongated member, said Y-elongated member, said X-leg section, said X-driving mechanism, said Y-driving mechanism and said first Z-driving mechanism with respect to said Y-leg section when said Y-leg section is in the supporting state;
    an X-connecting member connected to distal ends of each of a pair of said X-elongated members;
    a Y-connecting member connected to distal ends of each of a pair of said Y-elongated members;
    an X-cylinder plate rotatably connected to each of said X-connecting members; and
    a Y-cylinder plate rotatably connected to each of said Y-connecting members;
    wherein said first inclining means causes axial rotation of said X-connecting members with respect to said X-cylinder plates and said second inclining means causes axial rotation of said Y-connecting member with respect to said Y-cylinder plate.

2. The walking robot according to claim 1, further comprising:
    a first grounding section being provided to said X-leg section;
    a first joint section being provided between said X-leg section and said first grounding section;
    a second grounding section being provided to said Y-leg section; and
    a second joint section being provided between said Y-leg section and said second grounding section.

3. The walking robot according to claim 1, wherein said X-leg section is provided to each end of said X-elongated member, and said Y-leg section is provided to each end of said Y-elongated member.

4. The walking robot according to claim 2, wherein an X-leg section is provided at each distal end of said X-elongated member, and a Y-leg section is provided at each distal end of said Y-elongated member.

5. The walking robot according to claim 1,
wherein said X-driving mechanism, said Y-driving mechanism, said first Z-driving mechanism and said second Z-driving mechanism are cylinder units, which are driven by fluid pressure.

6. The walking robot according to claim 5,
wherein said fluid pressure is compressed air.

7. The walking robot according to claim 5,
wherein said X-driving mechanism has at least one X-cylinder, whose both ends are opened and which is pierced through and fixed in said moving body in the X-direction,
said X-elongated member is movably pierced through said X-cylinder wherein said X-elongated member is driven by fluid pressure in the X-direction,
said Y-driving mechanism has a Y-cylinder, whose both ends are opened and which is pierced through and fixed in said moving body in the Y-direction, and
said Y-elongated member is movably pierced through said Y-cylinder wherein said Y-elongated member is driven by fluid pressure in the Y-direction.

8. The walking robot according to claim 7,
wherein there are provided a pair of X-cylinders in said X-driving mechanism,
there is provided a corresponding X-elongated member to each of said X-cylinders,
there are provided a pair of Y-cylinders in said Y-driving mechanism, and
there is provided a corresponding Y-elongated member to each of said Y-cylinders.

9. The walking robot according to claim 1,
wherein said moving body has a first constituting member, which is capable of moving on said X-elongated member in the X-direction, and a second constituting member, which is rotatably connected to said first constituting member and capable of moving on said Y-elongated member in the Y-direction.

10. The walking robot according to claim 9,
further comprising rotary driving means for mutually rotating said first constituting member and said second constituting member, said rotary driving means being provided to said first constituting member.

11. The walking robot according to claim 10,
wherein said rotary driving means is a servo motor.

12. The walking robot according to claim 9,
further comprising rotary driving means for mutually rotating said first constituting member and said second constituting member, said rotary driving means being provided to said second constituting member.

13. The walking robot according to claim 12,
wherein said rotary driving means is a servo motor.

14. The walking robot according to claim 1,
further comprising control means for controlling said X-driving mechanism, said Y-driving mechanism, said first Z-driving mechanism and said second Z-driving mechanism.

15. The walking robot according to claim 10,
further comprising control means for controlling said X-driving mechanism, said Y-driving mechanism, said first Z-driving mechanism, said second Z-driving mechanism and said rotary driving means.

16. The walking robot according to 1,
wherein said first inclining means and said second inclining means are servo motors.

17. The walking robot according to claim 10,
wherein said rotary driving means is a mechanism including an air cylinder unit.

18. The walking robot according to claim 1, further comprising:
sucking pads being provided at an end of each said X-leg section and said Y-leg section; and
a vacuum generator being connected to the inner space of each sucking pad.

19. The walking robot according to claim 18,
further comprising control means for controlling said vacuum generator to make the inner space of said sucking pad, which has been grounded, negative pressure.

20. The walking robot according to claim 1, wherein said first inclining means is a first servo-motor fixed to one of said X-cylinder plates and said second inclining means is a servo-motor fixed to one of said Y-cylinder plates.

21. The walking robot according to claim 20, wherein said X-connecting member pivots with respect to said X-cylinder plate about a common motor shaft connected to said first servo motor.

22. The walking robot according to claim 20, wherein said Y-connecting member pivots with respect to said Y-cylinder plate about a common motor shaft connected to said second servo motor.

* * * * *